March 15, 1949. J. T. PHIPPS 2,464,653
INTERLOCKING CIRCULAR PACKING
Filed Oct. 8, 1945
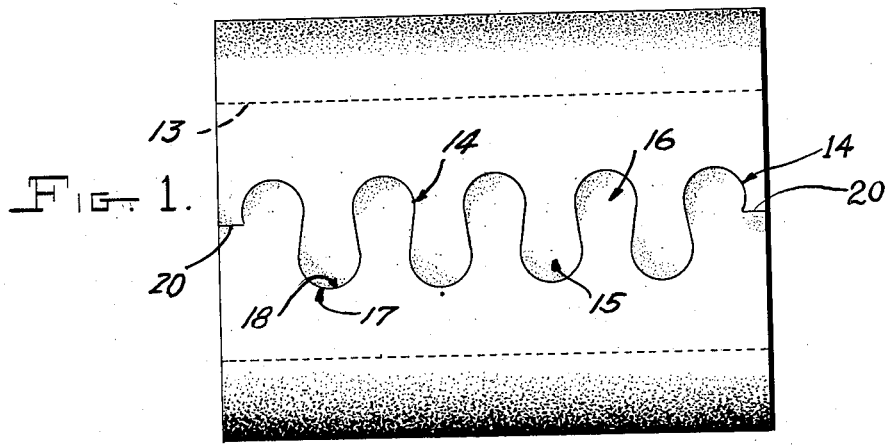
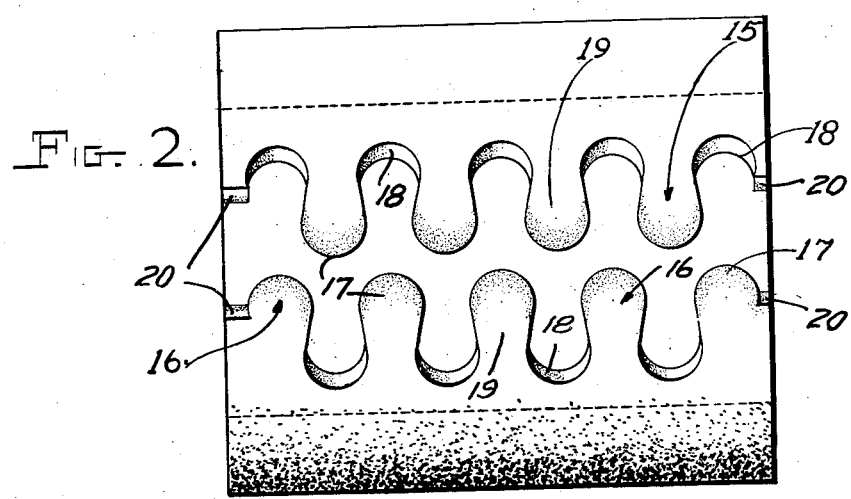
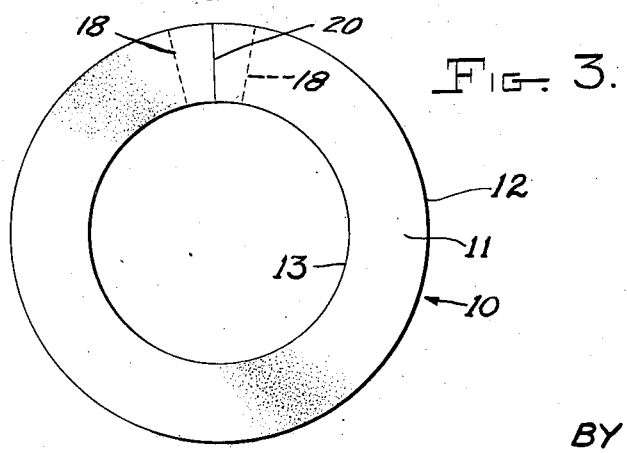
JOHN T. PHIPPS
INVENTOR
BY *James M. Abbott*
ATTORNEY Patented Mar. 15, 1949

2,464,653

UNITED STATES PATENT OFFICE 2,464,653

INTERLOCKING CIRCULAR PACKING

John T. Phipps, Huntington Park, Calif., assignor, by mesne assignments, of one-third to William F. Sturdivant, one-third to Carl E. Phipps, and one-third to John T. Phipps Application October 8, 1945, Serial No. 621,149

1 Claim. (Cl. 288—35)

This invention relates to means for packing pipe joints, pump rods, pistons, and the like, and particularly pertains to interlocking circular packing.

In the use of various pieces of equipment, such, for example, as pipe joints, reciprocating piston rods, and the like, it is common practice to employ circular packing members through which a cylindrical member extends and around which the packing is gripped to provide a fluid-tight packing for the cylindrical member. The most effective type of packing for this purpose is provided with a continuous annular wall made of resilient material and often reinforced by fabric which is embedded therein. In actual operation, however, there are objections to the use of this type of packing since it is necessary to completely remove the packing collars, stuffing boxes, retaining rings, and the like, in order to place the packing in a circumscribing position upon a cylindrical member, or to remove it therefrom. This operation often takes a considerable period of time and causes the apparatus to be out of commission for a time which is objectionable to efficient and profitable operation of the equipment. It is desirable, therefore, to provide a packing which may be easily mounted upon a cylindrical member to be packed without dismantling the entire structure. It is also common practice to use a plurality of separate packing rings which are split longitudinally on a diagonal line from one flat face of the packing to the other. These rings are assembled within a packing gland, or around a cylindrical member, to be packed with their joints staggered. This is done to prevent a continuous channel to occur from one end of the packing to the other, and through which fluid would leak. In actual practice it has been found that due to lack of uniformity in the circumferential dimensions of these individual rings, there is a tendency for the inclined faces of the rings of larger circumference to "climb" with relation to each other and to be offset, and for the inclined faces of the rings of shorter circumference to spread apart. It is necessary, therefore, to apply excessive pressure to compress the group of rings together and this results in a binding of the rings upon the cylindrical member, and increases the wear upon the rings. It is the principal object of the present invention, therefore, to provide a packing member which will have the advantages of a continuous sleeve and a continuous wall structure, as well as the assembly advantages of the split rings whereby an effective packing may be placed upon a cylindrical member without dismantling the structure, and may be easily held in a fluid-tight position without requiring excessive packing pressure.

The present invention contemplates the provision of an annular packing member which has uniform wall thickness and may be of any desired length, said wall being split longitudinally along a sinuous line whereby a plurality of interlocking tangs will be formed along the contiguous edges of the split and will hold the packing structure in a condition to provide a continuous wall surface and a wall of uniform thickness and weight throughout.

The invention is illustrated, by way of example in the accompanying drawing, in which:

Figure 1 is a view in side elevation, showing a section of packing embodying novel features of the present invention.

Fig. 2 is a view in side elevation, similar to that shown in Fig. 1, but disclosing the packing with its longitudinal joint spread open preparatory to a locking action.

Fig. 3 is an end view showing the packing in the condition in which it is locked upon or within a cylindrical member.

Referring more particularly to the drawing, 10 indicates a packing structure. As seen in Fig. 3, this structure is cylindrical in shape and has a wall portion 11, described by an outer cylindrical wall surface 12, and an inner cylindrical wall surface 13. The packing may be of any desired length, and in fact, it may be made in sections of considerable length to be thereafter cut as required. The wall of the packing, as here shown, is made of gum rubber, or synthetic rubber. For some purposes it may be desirable to embody fabric in the wall structure.

The novelty of the present invention resides in the fact that the wall is split longitudinally along a sinuous line indicated at 14 in Fig. 1. Due to this arrangement a plurality of locking tangs 15 will be formed on one edge of the split, and locking tangs 16 will be formed upon the contiguous edge of the split. These tangs are defined by alternate semi-circular line sections, which delineate the contour of the tangs and produce a free semi-circular end 17, and a semi-circular gullet 18. The tangs are so made as to have a relatively narrow neck portion 19 so that the semi-circular ends 18 will be wider than the neck 19, thus insuring that when the end portion 17 of one tang is seated within the gullet 18 between tangs along the opposite contiguous edge of the split, the tangs 15 and 16 will interlock as shown in Fig. 1, and will provide a continuous thickness of wall without interruption. It is preferable that at the opposite ends of the contiguous edges 15 and 16 there shall be straight faces 20 which extend in the longitudinal plane of the central axis of the packing member. This plane is also at right angles to the end faces of the packing member and thereby insures a firm fit against any elements between which the packing member is confined.

In operation of the present invention, the packing member is made as shown on the drawing and may be of any desirable length as well as of any desired inside and outside diameters so that a wall section of desired thickness will be produced. It is preferable that the wall shall be made of a good grade of gum or synthetic rubber. However, fibrous reenforcing material may be incorporated within the rubber if desired. When the packing is to be used, force is applied to deform the packing member so that the tang ends 17 of the contiguous edges 15 and 16 will be forced apart by a sliding motion which will cause the tang ends 17 to slide from within the gullets 18. Thus the packing can be spread open to receive a cylindrical member to be embraced thereby, after which the contiguous edges 15 and 16 are again forced to their interlocking positions. This is done by forcing the tang ends 17 between each other and to their seated positions between the complementary gullets 18. This is possible due to the resilience of the material from which the packing is made which allows the relatively wide tang ends to be compressed and deformed as they are forced into the relatively narrow throats occurring at the mouth of the gullets 18. After the tang ends 17 have been forced to their positions in register with the gullets 18, and seated therein, a continuous wall will be produced having interlocking edges and a meeting surface along said edges which is in contact completely throughout the length of the split.

It will be seen from a study of Fig. 1 of the drawing, that this packing does not have a continuous straight split through its wall as is the usual practice, but that the contiguous faces of the split are represented by the sinuous line 14 which insures that regardless of whether or not the wall is compressed radially or longitudinally, the edges 15 and 16 will be forced into a tighter interlocking position, and will produce a packing which is in effect seamless and of uniform thickness throughout. In fact, it has been found in actual practice that the oblique abutting faces between the sides of the tangs will be formed tightly together as pressure is applied lengthwise of the packing. This will produce a fluid-tight seal with the application of a minimum amount of pressure to compress the packing. For this reason the packer does not have any appreciable wear and lasts a long time. Actual tests have proven that as compared with split multiple ring packers, the life of the packer here disclosed is many times that of a packer of the split ring type.

It will thus be seen that the invention here disclosed provides a packing which may be easily placed upon or removed from a member which it embraces, and the walls of which interlock in a manner to insure that the packing will be of uniform wall thickness, and will have a fluid-tight joint when applied for use.

While I have shown the preferred form of my invention as now known to me, it is to be understood that various changes may be made in the combination, construction and arrangement of parts thereof by those skilled in the art, without departing from the spirit of the invention as claimed.

Having thus described my invention, what I claim and desire to secure by Letters Patent is:

A packing member adapted to be confined within a cylindrical bore and to be compressed longitudinally while positioned upon a cylindrical member: said packing member comprising a tubular cylindrical structure embracing the cylindrical member and fitting within the tubular bore, the wall of which resilient structure is split longitudinally along a sinuous line defined by longitudinally straight portions at the opposite ends thereof and extending radially through the structure and continuing in a sinuous line extending alternately at opposite sides of the straight radial plane of the end split portions and being semicircular form at each side of the plane, the diameter of the semicircular portions being greater than the distance between the contiguous edges along said longitudinal plane whereby a plurality of interlocking tangs will be formed, the surfaces of which tangs at opposite sides of said longitudinal plane are radial with the center of the structure.

JOHN T. PHIPPS.

REFERENCES CITED

The following references are of record in the file of this patent:

UNITED STATES PATENTS

| Number | Name | Date |
| --- | --- | --- |
| 70,383 | Wilmot | Oct. 29, 1867 |
| 164,444 | Grilley | June 15, 1875 |
| 281,760 | Gingras | July 24, 1883 |
| 1,298,100 | Royce | Mar. 25, 1919 |